United States Patent [19]

Morganstein et al.

[11] Patent Number: 4,922,526
[45] Date of Patent: * May 1, 1990

[54] AUTOMATED ACCESS FACILITIES FOR USE WITH KEY TELEPHONE SYSTEMS

[75] Inventors: Sanford J. Morganstein, Elgin; Bakulesh A. Mehta, Downers Grove; Herbert B. Krakau, Elmhurst, all of Ill.

[73] Assignee: Dytel Corporation, Schaumburg, Ill.

[*] Notice: The portion of the term of this patent subsequent to Jul. 18, 2006 has been disclaimed.

[21] Appl. No.: 356,742

[22] Filed: May 24, 1989

Related U.S. Application Data

[63] Continuation of Ser. No. 133,318, Dec. 16, 1987, Pat. No. 4,850,012.

[51] Int. Cl.⁵ ............................................. H04M 3/50
[52] U.S. Cl. .................................. 379/157; 379/164; 379/217; 379/374; 379/67
[58] Field of Search ................. 379/156, 70, 157, 164, 379/217, 374

[56] References Cited

U.S. PATENT DOCUMENTS

| | | |
|---|---|---|
| 4,376,875 | 3/1983 | Beirne . |
| 4,696,028 | 9/1987 | Morganstein et al. . |
| 4,720,848 | 1/1988 | Akiyama ........................ 379/217 X |
| 4,737,979 | 4/1988 | Hashimoto ...................... 379/70 X |
| 4,747,124 | 6/1988 | Ladd . |
| 4,783,796 | 11/1988 | Ladd . |

FOREIGN PATENT DOCUMENTS

| | | |
|---|---|---|
| 56-129469 | 9/1981 | Japan . |
| 57-28493 | 2/1982 | Japan . |
| 57-54492 | 3/1982 | Japan . |
| 57-190493 | 11/1982 | Japan . |
| 58-181356 | 10/1983 | Japan . |
| 59-86357 | 5/1984 | Japan . |
| 60-117894 | 6/1985 | Japan . |
| 1397841 | 9/1972 | United Kingdom . |

*Primary Examiner*—Stafford D. Schreyer
*Attorney, Agent, or Firm*—Richards, Medlock & Andrews

[57] ABSTRACT

A call processor (32) for intercepting incoming calls to a key telephone system (10) and returning a message to a calling party. A digital message storage unit (48) stores messages associating called parties with respective pseudo-telephone numbers so the calling party can input information identifying a desired called party. A CPU (50) of the call processor (32) references a look-up table (52) with the pseudo-telephone number input by the calling party to select and transmit a message via an intercom line (36) to the key telephone system (10). The message carried by the intercom line (36) broadcasts a message relating to the identity of the called party as well as the line to utilize.

52 Claims, 3 Drawing Sheets

| 10 | POINTER ADDRESS | MESSAGE LENGTH |
| 11 | POINTER ADDRESS | MESSAGE LENGTH |
| 12 | POINTER ADDRESS | MESSAGE LENGTH |
| 13 | POINTER ADDRESS | MESSAGE LENGTH |
| 14 | POINTER ADDRESS | MESSAGE LENGTH |
| 15 | POINTER ADDRESS | MESSAGE LENGTH |
| 16 | INSTRUCTION ||
| 17 | INSTRUCTION ||
| 18 | INSTRUCTION ||
| 19 | INSTRUCTION ||
| 20 | INSTRUCTION ||

AUTOMATED ACCESS FACILITIES FOR USE WITH KEY TELEPHONE SYSTEMS

RELATED APPLICATION

This application is a continuation of U.S. Patent Application Ser. No. 133,318, filed Dec. 16, 1987, U.S. Pat. No. 4,850,012 and assigned to the assignee hereof.

TECHNICAL FIELD OF THE INVENTION

The present invention relates in general to telecommunications systems, and more particularly relates to key telephone systems.

BACKGROUND OF THE INVENTION

Various types of telecommunication systems are available to provide services for satisfying particular needs. For example, private automatic branch exchange (PABX) switching systems are available for servicing businesses having a few subscriber sets up to thousands of subscriber sets. Typically, PABX systems are readily adapted for use with small businesses, and wherein a switchboard attendant typically receives incoming calls and controls the switching system to provide the calling party a telecommunication path through the PABX system to the called party.

Key telephone systems are another type of switching system which are generally less sophisticated for economically serving a relatively few number of telephone sets. The basic key telephone system includes a number of key telephone sets connected through a central control unit to each of a number of key telephone sets. Each key telephone set includes a number of subscriber lines connected thereto. Thus, when an incoming call is directed to such a system, a lamp is lit on each telephone set to indicate an incoming call. The button associated with the ringing line can be pushed on any telephone set so that any party can respond to the incoming call and inquire as to the identity of the desired called party. The party initially answering the key telephone set then communicates, either verbally or by way of intercom or public address broadcast facilities, the identity of the called party and the line number associated with the incoming call.

More sophisticated key telephone systems provide the same general function, but include additional features such as the ability to place a line on hold, paging, intercom, music-on-hold and access to centralized dictating equipment.

While key telephone systems continue to be improved, such as by the addition of new features and functions, processor controlling the system to enhance its flexibility, carrying out functions with electrical or integrated circuits which were heretofore conducted by mechanical elements, etc., the basic shortcoming of such systems is that the first party to answer the incoming call must function somewhat as a switchboard attendant, in that such person must control the system and direct the incoming call to the appropriate called party. Hence, the completion of a call employing a key telephone set generally requires the cooperation of two persons. Not only is this an uneconomical use of time, but also the calling party has to communicate generally with an intermediate person before a final connection is made to the desired called party.

From the foregoing, it can be seen that a need exists for telecommunication facilities adapted for streamlining a key telephone system, and enabling more efficient completion of telephone calls to called parties associated with such a system. An associated need exists for call processing equipment which is readily adapted to function in conjunction with a key telephone system, without substantial modification to such system.

SUMMARY OF THE INVENTION

According to the invention, call processing facilities are disclosed for use in conjunction with a key telephone system, the combination of which reduces or substantially eliminates the shortcomings associated with the apparatus and the techniques known in the art.

In accordance with the preferred embodiment of the present invention, a call processor is adapted for connection between a key telephone system and incoming trunks directed thereto. The call processor intercepts calls directed to the key telephone system, and after processing such incoming calls, redirects such calls, via other trunks, to the key telephone system. Connecting the call processor to the key telephone system is an intercom line for providing voice announcements or messages through the key telephone system to called parties.

Telephone calls directed to the key telephone system are intercepted by the call processor, wherein an instructional message is returned to the calling party informing the calling party to select a party associated with the key telephone system by dialing a pseudo-extension number associated with each such party. The instructional message further instructs the calling party to dial the particular pseudo-number which is associated with the desired called party. On receiving such information, the call processor seizes one of the trunks connected to the key telephone system and applies ringing signals thereto. In addition, synthesized voice signals are produced by the call processor and output on the intercom line to the key telephone system. The users of the key telephone system can hear or visually observe which key telephone line is ringing, and are also apprised via the broadcast facilities as to which party should answer the line. With this arrangement, a more efficient utilization of the key telephone system is had, as well as that of the persons using such system.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same or similar parts throughout the views, and in which.

DETAILED DESCRIPTION OF THE INVENTION

Figure 1:
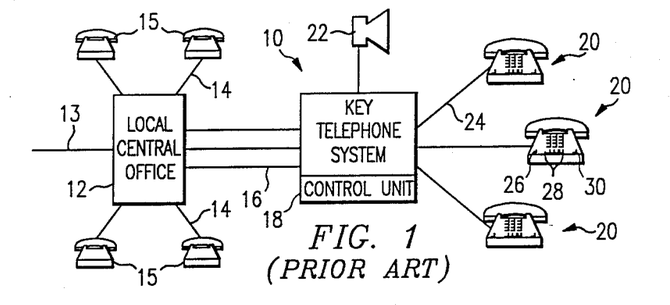
FIG. 1 illustrates the general construction of a conventional key telephone system.

FIG. 1 illustrates the basic components of a key telephone system 10, as connected to a telecommunication network comprising a local central office 12. The local central office 12 services a number of trunks 13 and subscriber lines 14 for providing telecommunication services to other central offices and subscriber sets 15. Local central offices 12 are generally equipped with ground start or loop start trunks 16 which are well suited for providing telecommunication services to key telephone systems, as shown in the example by reference character 10. The key telephone system trunks 16 each comprise a tip and ring pair for providing signalling and speech information between the key system 10 and the local central office 12.

The key telephone system 10 includes a centralized control unit 18, which can be program driven to extend telephone service to each of the key telephone sets, one shown by reference character 20. As noted above, a typical key telephone system 10 may serve generally five to forty or more such key telephone sets 20. The invention may also be employed in telephone systems integrating both key telephone and PBX functions. The key telephone system 10 may be also equipped with one or more public address speakers 22 for providing general audio announcements concerning incoming telephone calls.

The operation of the present invention is facilitated by understanding the operation of the exemplary key telephone system 10. Each key telephone set 20 may be typically connected to the central control unit 18 by a number of conductors 24, including one wire pair carrying speech signals, another for "hold" functions, and a third for illuminating a line button lamp. Additional features, if provided, such as handsfree operation, may require additional conductors. Each key telephone set 20 is provided with conventional circuits to provide dial pulse or rotary pulse operation, and talk and listening capabilities. More sophisticated key telephone systems provide communications between the central control unit and each key telephone set by a single pair of conductors and using encoded digital signals for controlling the various functions.

In contrast with standard telephone sets, the key telephone set 20 is provided with a number of illuminated push-buttons, including a hold button 26, a number of line buttons 28, and an intercom button 30. There is usually one line button 28 for each telephone speech line connecting the central control unit 18 to the key telephone set 20. Additional circuits are provided to illuminate the various push-buttons to indicate the present status of each respective telephone line. For example, when a telephone line is idle, the associated line button lamp 28 will be extinguished. When busy, such as during a telephone conversation, the respective line button lamp will be illuminated with a constant intensity. On an incoming call the key telephone set 20 is rung by signals from the central office 12, in which event the line button lamp will blink to provide persons in the vicinity of the telephone with an indication of which line button 28 to push and answer the incoming call. Audible ringing is also provided. To provide a "hold" function, the hold button 26 is depressed and the respective telephone line is placed in a hold condition by the central control unit 18. The line button lamp 28 associated with a line placed on hold will blink at a different rate than that of ringing signals, thereby allowing persons to know which line is on hold. Lastly, users of the key telephone set 20 can depress the intercom button 30, key in a specified code, whereupon the central control unit 18 provides a connection to the broadcast announcement speaker 22 to allow the user of the key telephone set 20 to make a public address announcement. Such an announcement may be in the nature of a request to a particular party to answer a particular line.

The completion of an exemplary telephone call by the key telephone system 10 is accomplished as follows. A calling party, such as associated with remote telephone set 15, desiring to communicate via the key telephone set 20 with a called party, initiates the call by going off hook and dialing the directory number of the business entity using the key telephone system 10. In response to the initiation of an incoming call, the central office 12 applies ringing signals to one of the idle trunks 16, which signals are detected by the central control unit 18 of the key telephone system 10. The central control unit 18 then causes ringing signals to be applied directly to each key telephone set 20, and also causes the illumination of the line button lamps 28 associated with the incoming ringing signals. Any person hearing the audible ringing output by each of the key telephone sets 20 can simply lift the handset of one of the key telephone sets, push the button which is blinking according to the incoming ringing signals, and communicate with the calling party. Of course, once the handset is lifted from the cradle of the key telephone set 20, an off-hook condition results, whereby the central office 12 disconnects the ringing signals from the trunk 16.

The calling party and the person answering the key telephone set 20 can then converse to determine the desired party with whom the calling party wishes to communicate. The person answering the key telephone set 20 can then push the hold button 26 to place the calling party, or line, on hold. Next, the intercom button 30 can be depressed and the appropriate code input by the keypad to cause the central control unit 18 to provide a connection to the loudspeaker 22. When so connected, the party answering the key telephone set 20 can make a general announcement in an attempt to alert the desired called party of the incoming call. For example, the person answering the key telephone set 20 may make an announcement in the nature of "John Smith, you have a call on line two." It should be understood that such an announcement can also be made verbally to the desired called party who may be in the immediate vicinity of the person answering the key telephone set 20, without the use of the intercom speaker 22. The desired called party can respond to the incoming call by depressing the line two button 28 and communicate with the calling party. It can be seen that both the apparatus and procedure for providing communications are quite different from that provided by PBX or other types of switching systems. It will be understood from the ensuing description of the invention that a significant improvement in the efficiency key telephone systems can be realized.

Figure 2:
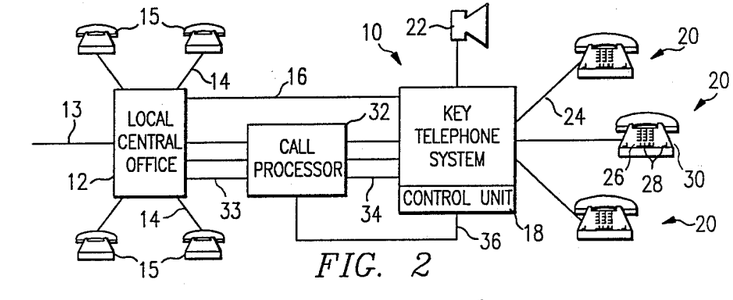
FIG. 2 illustrates, in block diagram form, the integration of the invention with a key telephone system.

FIG. 2 depicts the integration of the apparatus of the present invention with the key telephone system 10 to enhance the operation thereof. In the preferred embodiment of the invention, a call processor 32 is interconnected between the local central office 12, via incoming trunks 33, and the key telephone system 10, via other trunks 34. In the preferred form of the invention, the call processor 32 can provide interconnections between the incoming trunks 33 and the key telephone trunks 34, on a one-to-one basis. Provided also is a voice message path 36 between the call processor 32 and an intercom input of the key telephone system 10. Messages generated by the call processor 32 can be transmitted on the voice message path 36 and broadcast by the key telephone system 10 on the paging system 22. Conversations between the calling party and person using the key telephone system 10 are carried by the tip and ring trunk pairs of the key telephone system trunks 34.

Briefly, an incoming call switched by the local central office 12 to incoming trunks 16 is intercepted by the call processor 32. The respective incoming trunks 33 and the key telephone system trunks 34 are not cut-through by the call processor 32, and thus such ringing signals do not initially appear at the key telephone system 10. Rather, the call processor 32 generates an instructional message which is transmitted to the calling party, and includes a message content in the nature of the following text. "Thank you for calling ABC Company, you may dial your party's extension number any time during this message. For the sales department, dial 1; for service, dial 2 . . . . If you need assistance, please hold for the operator." Such numbers are pseudo-numbers, and are provided as a convenience for allowing the calling party to input information which both identifies the called party and which is in a form that can be readily decoded by circuits of the call processor 32.

The call processor 32 then provides a ringing signal on an idle key telephone system trunk 34, whereby the central control unit 18 of the key telephone system 10 makes a connection on an associated subscriber line to each of the key telephone sets 20. Thus, the first line indicates the arrival of a new call on each of the key telephone sets 20. These sets 20 will be rung, and the associated line button lamp 28 will blink. Concurrent with the ringing of the key telephone sets 20, the call processor 32 consults a look-up table to provide a cross-reference between the digits dialed by the calling party, and the called party referenced thereby. Such a look-up table has entries of the names of each person to whom communications can be established through the key telephone system 10. Associated with each person's name is a unique number which can be input by the calling party pursuant to the instructional message. When accessed by the call processor 32 the look-up table controls the call processor 32 to appropriately output a unique message on the intercom line 36 in the nature of an announcement informing the selected party of an incoming call on a particular line. For example, the message content may be "John Smith, you have a call on line one." When an off-hook condition is noted with respect to line one, the call processor 32 senses such condition and provides a cut-through between the incoming trunk 33 and the associated key telephone system trunk 34. The calling party can then communicate with John Smith. Importantly, it can be appreciated that the present invention facilitates the connection between a calling party and a called party, without the intervention of intermediate parties. To be described below, provisions are made for assisting the calling parties when required.

Figure 3:
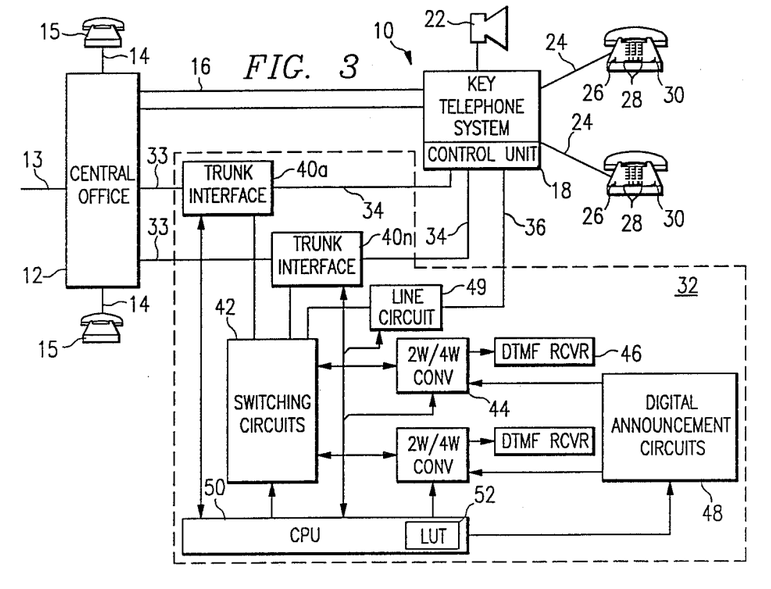
FIG. 3 illustrates in detailed block form the apparatus of the preferred embodiment of the invention.

With reference now to FIG. 3 of the drawings, there is illustrated the detailed construction of the call processor 32 of the invention. The major components of the call processor 32 include a number of trunk interfaces 40a-40n, each for interfacing an incoming trunk 33 with a respective key telephone system trunk 34. The trunk interfaces 40a-40n are of the 3-port type which are more fully described below. Each trunk interface 40a-40n includes an analog communication path to a switching matrix 42 which has connected to the input thereof two-wire/four-wire converters 44, commonly termed "hybrids." The hybrids provide for a bidirectional transmission of information on one side thereof, and separate transmit and receive information on another side thereof. One output port of each hybrid 44 is connected to a respective DTMF receiver 46. The DTMF receiver 46 is effective to receive DTMF signals and convert the same into corresponding digital signals representative of digits. Connected on the input transmit port of each hybrid 44 is a digital message announcement unit 48.

A line circuit 49 is connected between a switched output of the switching matrix 42 and the intercom line 36 of the key telephone system 10. The line circuit 49 comprises conventional telephone interface circuitry for interfacing the digital announcement circuit 48 to the intercom line 36. Essentially, the line circuit 49 provides on-hook and off-hook conditions, plus tone generation capabilities to the intercom line 36. Under control of the CPU 50, the line interface 49 can seize the intercom line 36 for transmission thereover of tones or audio message announcements.

The message announcement unit 48 comprises a memory storage unit for storing all the messages required by the call processor 32 for providing communications both to the calling party and to the called party. One type of message stored in the message announcement unit 48 is a greeting for identifying the business or entity using the key telephone system 10, as well as the association between the called parties and the pseudo-extension numbers. Other messages stored may be utilized in default situations, such as when the calling party does not know the name of a specific called party, but will speak to anyone who will answer on behalf of the business. Apparatus for storing instructional messages and for expediting the completion of telephone calls to switching systems is disclosed in U.S. Pat. No. 4,696,028, the disclosure of which is incorporated herein by reference.

As can be appreciated, many other messages may be stored in the message announcement unit 48 for assisting calling parties in completing telephone calls to the key telephone system 10. For example, messages relating to day and night operations of the business entity may be stored to facilitate the completion of a call to the correct party. Moreover, the message may be structured so that the call can be directed to the appropriate department, such as sales or marketing, without respect to a particular individual. One such message may be: "Sales department, pick up a call on line three." In this manner, those persons not involved with sales will not pick up the phone call and thus a more efficient and direct completion of the call is accomplished.

Other messages stored in the message announcement unit 48 are of the type which are transmitted via the intercom line 36 to the key telephone system 10. Such messages are specifically selected based on information input by the calling party. More particularly, and in accordance with the present invention, the message announcement unit 48 has stored therein messages instructing the users of the key telephone system 10 of the presence of an incoming call, who the call is for and which line to select for communicating with the calling party. The message announcement unit 48 also contains message content pertaining to cases when the call is not picked up by anyone within a prescribed period of time. As noted above, other messages relating to default conditions can also be stored in the message announcement unit 48 for instructing specific persons, or anyone in general, to respond to incoming calls in the event that no specific called party is designated by the calling party. The message announcement unit 48 is connected to the interface (not shown) of a central processing unit (CPU) 50 so that the CPU 50 can select the particular message to be transmitted, and select whether to transmit such message to the central office trunk 33 or to the intercom line 36.

The CPU 50 is connected to each of the major components of the call processor 32, as noted in FIG. 3.

The CPU 50 is connected to each trunk interface 40a–40n for sensing requests for service from the central office 12. Such requests for service may be in the nature of ringing signals applied to the incoming trunks 33. In addition, the CPU 50 can direct signals to each trunk interface 40a–40n for controlling equipment therein to apply ringing signals to the key telephone system trunks 34. The CPU 50 additionally controls the switching matrix 42 to selectively provide a switched path from one or more of the trunk interface circuits 40a–40n to the hybrids 44. In practice, fewer hybrid circuits 44 than interface trunks 40a–40n are required as each hybrid circuit 44 is required only during a portion of the time when the trunk interface circuits 40a–40n are being utilized. Hence, by utilizing the switching matrix 42 for switching a hybrid 44 and a respective DTMF receiver 46 to one of the trunk interface circuits 40a–40n, optimum utilization of equipment is realized. The switching matrix 42 also includes a section which is effective to connect the intercom line 36, via the line circuit 49, to any one of the bidirectional outputs of the hybrids 44. In this manner, messages can be selected in the digital announcement unit 48 for transmission through the hybrids 44, the switching matrix 42 and to the intercom line 43. At the same time, the switching matrix 42 can provide a connection between one or more of the trunk interface circuits 40a–40n, through the hybrids 44, and to the DTMF receivers 46.

The CPU 50 is shown connected to each of the hybrid circuits 44 for controlling parameters therein such as gain. CPU connections are also provided to the DTMF receivers 46 for carrying decoded information to the CPU. For example, when a calling party is instructed via a message in the digital announcement unit 48 to input a pseudo-extension number, the DTMF digits input by the calling party are converted by the DTMF receivers 46 into digitals signals, and transferred to the CPU 50. The CPU 50 includes a look-up table 52 where the pseudo-extension numbers are cross-referenced to derive instructions for further controlling the CPU 50 to select a personalized message from the digital announcement unit 48 for transmission over the intercom line 43.

Figure 4:
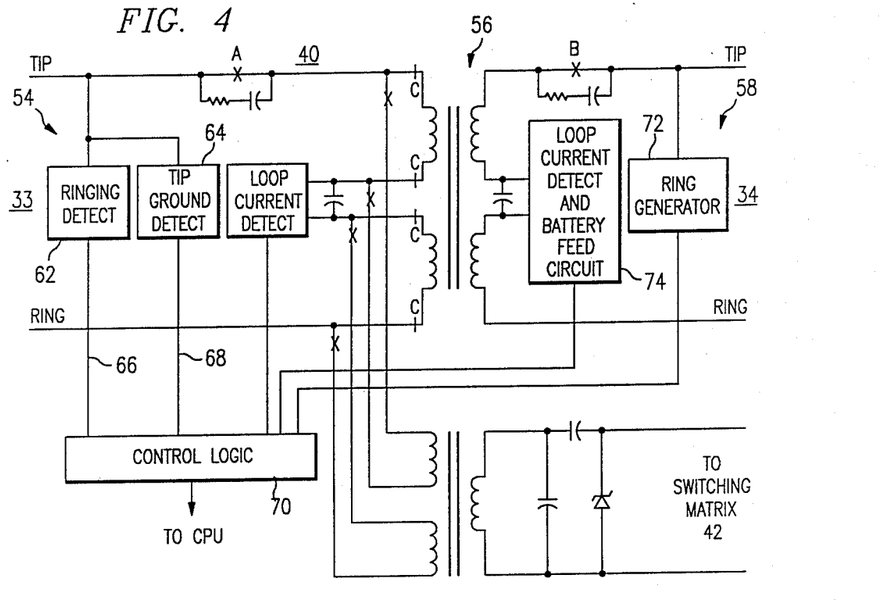
FIG. 4 is an electrical schematic diagram of a trunk interface circuit employed in the call processor.

A 3-port trunk interface circuit 40 is shown in more detail in FIG. 4 The trunk interface 40 includes an input port 54 connected to the incoming central office trunk 33, and through a transformer 56 to a second port 58 connected to a key telephone system trunk 34. A third port 60 is provided through which communication are effected to the switching matrix 42. Each of the three noted ports is capable of passing bidirectional voice signals, as well as DTMF dialling information.

The illustrated trunk interface 40 includes a ringing detect circuit 62 for detecting ringing signal requests for service originating from the local central 12. The ringing signals comprise an alerting signal signifying a request by the calling party for communicating with a called party of the key telephone system 10. The high voltage ringing signals provided on the tip and ring conductors of the incoming trunk 33 are detected by the ringing detect circuit 62 and converted into digital signals which are sensed by interface of the CPU 50. A ground detect circuit 64 is provided for detecting a grounded tip conductor of the incoming trunk which signifies another type of request for service.

Each noted detector includes a respective monitor and control conductor 66 and 68 coupled to a control logic circuit 70 which serves as an interface to the CPU 50. The control logic circuit 70 controls the operation of A, B and C relays, the contacts of which are switchable to appropriately direct input and output signals to desired destinations. Specifically, the unoperated state of relay A allows ringing signals on the incoming trunk ring conductor to pass to the ring detect circuit 62 where ringing signals are detected. Similarly, a signal from the local central office 12 on a ground start type trunk is accomplished by coupling the ground from the tip conductor to the ground detector 64 through the normally closed A relay contact. Either indication of a request for service is coupled to the CPU 50 by appropriate monitor points in the control logic circuit 70.

When a request for service, such as a ringing signal on the trunk ring conductor is sensed by the CPU 50, relay A is operated to trip ringing. Relay C is also operated to provide a communication path between the calling party and the switching matrix 42. A message originating from the digital announcement circuit 48 is then dispatched to the calling party, in response to which the calling party may dial a pseudo-extension number.

Upon receiving the first digit of the dialed pseudo-extension number, the CPU 50 terminates the message transmission to the calling party. After conventional validity checks are conducted on the dialed number as a whole, the digits are used for cross-referencing in the look-up table 52, to be discussed in more detail below. Relay C is then released, and relay B is operated to establish a communication path between the local central office 12 and the key telephone system 10. Loop current flowing from the local central office 12 through the trunk interface 40 is detected by the local central office 12 as an indication that audible ringing to the calling party should be terminated.

A ringing generator 72 is connected between the tip and ring of the key telephone system trunk 34 for applying ringing signals thereto. The ringing generator 72 is controlled by the CPU 50 through the control logic 70 for applying and removing ringing signals to the key telephone system trunk 34. Also connected to the second port 58 of the trunk interface circuit 40 is a loop current detect and battery feed circuit 74 for detecting closed loop conditions of the key telephone system trunk 34 as generated by the key telephone system 10, and for providing talk battery to the key telephone system trunk 34 according to conventional methods.

From the foregoing, it can be seen that the CPU 50 is effective in sensing requests for service from the local central office 12 and controlling the switched paths within the trunk interface 40 to accomplished a desired communication path between the three ports thereof.

Figure 5:
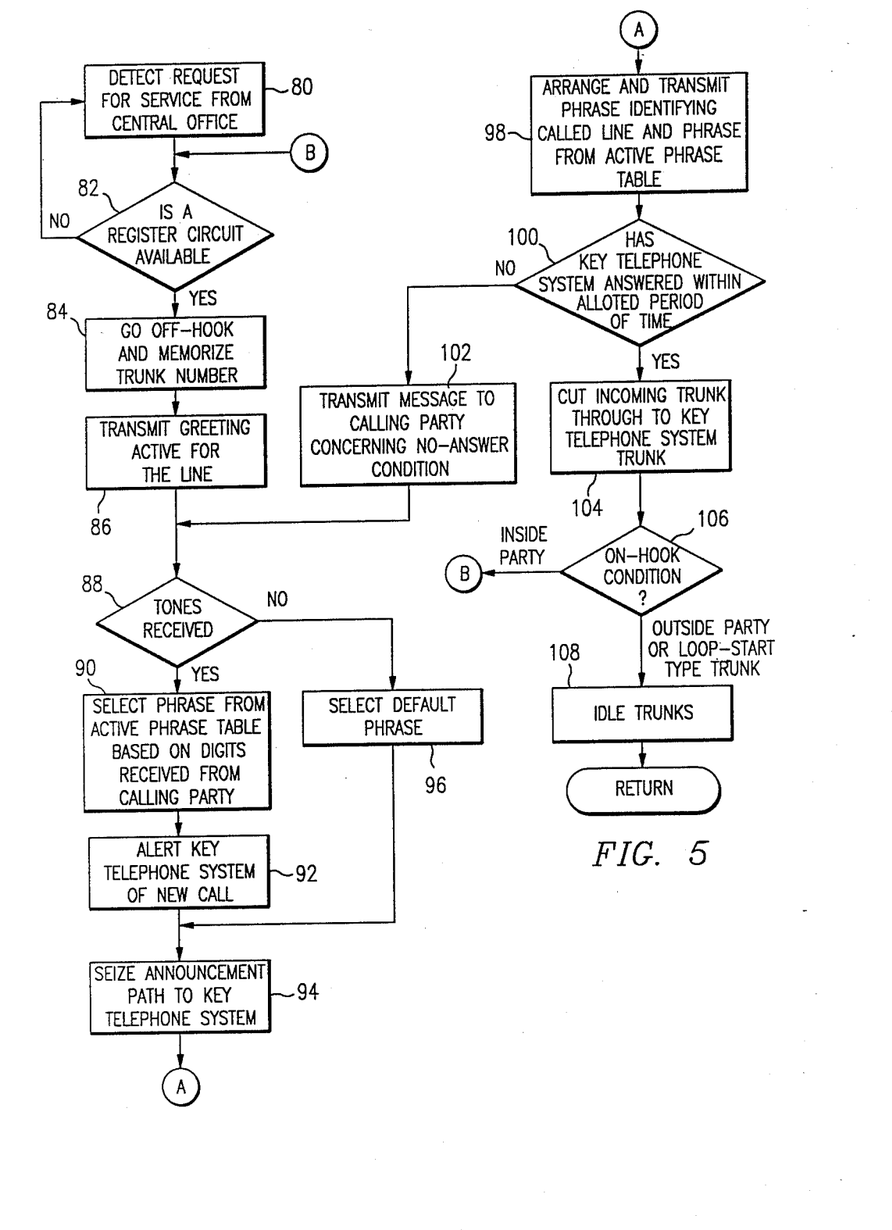
FIG. 5 is a generalized flow chart showing the programmed operation of the invention in completing an exemplary telephone call to a key telephone set of the key telephone system.

Having described the construction of the call processor 32, reference is now made to FIG. 5 where there is illustrated the program controlled operations thereof for facilitating the completion of telephone calls to the key telephone system 10. As noted by program block 80, the call processor 32 is programmed to sense or detect requests for service from the local central office 12. Requests for service in nature of ringing or grounded tip conductors are monitored by the detect circuits 62 and 64, via monitor conductors 66 and 68. The detection of a request for service is sensed by the control logic 70, and transferred to the CPU 50 for processing.

On the detection of a bona fide request for service from the local central office 12, the call processor 32 consults a busy/idle table (not shown) to determine if a DTMF receiver register 46 is idle. This is noted at block 82 of the flow chart. On a negative determination, the processor is branched back to block 80 to detect other requests for service. On an affirmative detection of a request for service, the CPU 50 branches to program flow block 84 where the trunk circuit 40 is controlled in such a manner as to close the loop, thereby signalling the local central office 12 to remove the ringing signal. The operation of relay C in the position shown in FIG. 4 is effective to complete a DC current path from the tip to the ring conductor of the incoming trunk 33. In addition, the call processor 32 memorizes, or otherwise notes the identity of the incoming trunk 33 requesting service.

Next, the trunk interface 40 is controlled to provide a speech path through the switching matrix 42 to the digital message announcement unit 48. In addition, the call processor 32 selects a greeting which is then active for the line requesting service. A table is maintained in the CPU 50 concerning the active greeting messages to be transmitted to callers on the respective incoming trunks 33. It can be realized that a single key telephone system 10 may be adapted for servicing different groups of customers, each of which may be associated with a different business entity. Thus, different greetings would be transmitted to the different calling parties. In addition, the look-up table identifying the current active messages may include different messages which may be made active during day and night operations of the respective businesses, or during holiday or other occasions which might necessitate a different message. For example, during working hours of the business associated with the key telephone system 10, the active message could be a greeting identifying the business, and reciting the employees' names and associated pseudo-extension numbers. For night operations, a message could be made active which has a message content relating to the business hours, and a telephone number or pseudo-extension number for reaching a predesignated party after working hours.

The active greeting can be changed automatically by the use of a real-time clock implemented within the CPU 50, whereupon the active message changes at predetermined times of the day. On the other hand, the active greeting can be changed manually by electrical switch means, or by dialling a special code into the call processor 32. The special code can be dialed by a user of the key telephone system 10 out of one of the outgoing trunks 16 to the central office 12, and rerouted by the central office 12 on an incoming trunk 33 to the call processor 32. The person can ignore the initial greeting, and dial in the special code which is recognized by the CPU 50 as a signal for changing or revising the current active message to make another message active.

After the active greeting is played, according to program flow block 86, the CPU 50 branches to decision block 88 and is placed in a wait state to determine if DTMF tones have been received from the calling party and decoded by the DTMF receiver registers 46. On an affirmative determination of the receipt of such tones, the CPU 50 consults the look-up table 52, as shown in block 90, to select a phrase from the active phrase table. Importantly, the phrase is selected based upon a cross-referencing with the digits input by the calling party. Such digits are the pseudo-extension numbers referred to above.

Figure 6:
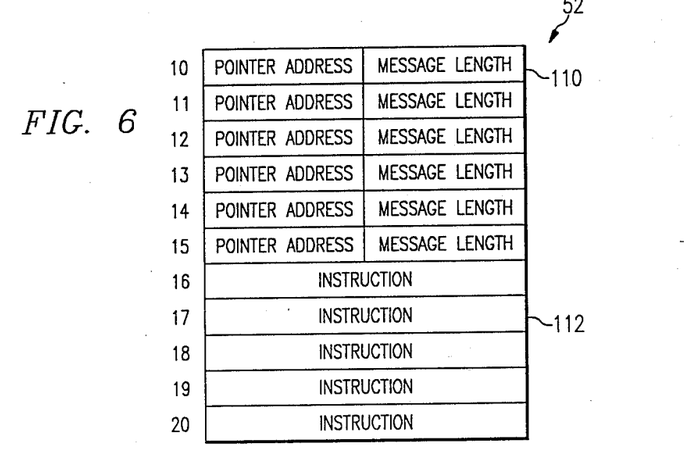
FIG. 6 illustrates the configuration of a look-up table utilized by the call processor for cross-referencing a dialed pseudo-extension number with a message to be transmitted to the key telephone system.

FIG. 6 illustrates an example of a look-up table referenced by the CPU 50 for selecting a phrase for transmission to the key telephone system 10 over the intercom line 36. The look-up table 52 has a number of reference indices 110 corresponding to the pseudo-extension numbers. Associated with each reference index 110 is a processor instruction 112 stored in the look-up table 52. The instructions 112 may take various forms, each of which can be carried out by the CPU 50 to perform an intended function. For example, the input of an invalid pseudo-extension number can result in the selection of a message which can be transmitted to the calling party for notification of the input of an improper pseudo-extension number, and a message concerning the input of a correct pseudo-extension number. As an alternative, the instruction 112 in the look-up table 52 which is referenced by an invalid pseudo-extension number may comprise a processor instruction which, when carried out, effectively disconnects the calling party and terminates the telephone call.

Other instructions which can be stored in look-up table 52 may be referenced by pseudo-extension numbers which are not assigned to any of the persons associated with the key telephone system 10. For example, and as noted above, certain pseudo-extension numbers can be input into the call processor 32 for changing the active phrase table. Accordingly, an instruction can be stored in the appropriate entry in the look-up table 52 for executing such a function.

Typically, and in a majority of instances, the look-up table 52 will comprise instructions which, when carried out by the CPU 50, select a particular phrase in the digital message announcement unit 48 for transmission over the intercom line 36 to the key telephone system 10. Such phrases provide an announcement concerning the particular line to pick up, as well as the identity of the party who should pick up such line. The instruction for carrying out such a function includes a pointer address, as well as a message length parameter. The pointer address is utilized by the CPU 50 in accessing the digital message announcement unit 48 at a predefined memory address to access the start point of a message. The message length parameter identifies the length of the message, in terms of the number of memory addresses or address blocks which encompass the entire message phrase.

With reference back to the flow chart of FIG. 5, once an active phrase is selected according to program block 90, the call processor 32 alerts the key telephone system 10 of a new incoming call, as indicated by block 92. The key telephone system 10 is alerted of such an event by the control logic 70 signalling the ring generator 72 to apply a ringing signal to the associated key telephone system trunk 34. Next, the CPU 50 establishes a speech path to the digital message announcement unit 48, and through the switching matrix 42 and line circuit 49, to the intercom line 36. Such path is employed for directing the selected phrase to the key telephone system 10, and for broadcast over the facilities thereof.

Depending on the intercom facilities of the key telephone system 10, the seizing of the intercom line 36 may require different procedures. For example, with key telephone systems having a dedicated intercom line 36, the call processor 32 need only control the line circuit 49 to present an off-hook condition to such line 36. In this type of system, the off-hook condition of the intercom line 36 signals the key telephone system 10 to connect such line 36 to the intercom or broadcast facilities 22. On the other hand, other key telephone systems may require the input of digits after the off-hook condition to seize the intercom or broadcast facilities 22. With such a system, the call processor 32 places the intercom line 36 in an off-hook condition and thereafter outpulses the requisite digits or DTMF tones for seizing the intercom or broadcast facilities 22.

An alternate path which may be taken by the CPU 50 is shown as program flow block 96, from block 88 to block 94. Program flow block 96 is encountered when tones are not received from the calling party, in which event the CPU 50 must provide an alternative, if possible, to completing the telephone call. Accordingly to block 96, the CPU 50 automatically selects a default message phrase from the digital message announcement unit 48 for transmission over the intercom line 36 to the key telephone system 10. Such a message is not specific as to a called party, but rather may be in the nature of requesting a person assigned operator-type duties to assist the calling party in completing the telephone call. For example, if Bob Jones has been assigned such a task, the message would be in the nature of "Bob Jones, assistance is required on Line 4." As yet another alternative, the message may be "Operator assistance is required on Line 4." With the latter type of message, no specific persons are identified, and thus by the very nature of the message itself, persons answering the call know that assistance is required.

Continuing with the flow diagram of FIG. 5, the call processor 32 arranges and transmits an announcement on the intercom line 36, which announcement comprises the called line number and the phrase selected from the active phrase table. This is illustrated in flow diagram block 98. The arrangement of the announcement includes the chaining together of a first message indicating the called line number and a second message comprising the phrase which identifies the person associated with the pseudo-extension number. Next, the CPU 50 encounters the instructions of decision block 100 where it is determined whether or not the key telephone system 10 has answered in an allotted time period. If no person answers the ringing line of any of the key telephone sets 20, the CPU 50 is branched to block 102 where a recording is transmitted to the outside calling party concerning the no-answer condition. Such a message is prestored in the digital message announcement unit 48 and selected by the CPU 50 for transmission via a switched path through the trunk interface 40, and thus dispatched to the calling party. From block 102, the CPU 50 is redirected back to decision block 88 where the call processing resumes.

When a key telephone set 20 goes off-hook in response to the incoming call and the appropriate line switch button depressed, such action is detected in the trunk interface 40 by the loop current detector 74. As a result, the CPU 50 terminates the ringing signals supplied by the ring generator 72 and cuts the incoming trunk 33 through to the key telephone system trunk 34, as noted in program flow block 104. The telephone conversation between the calling party and the called party of the key telephone system 10 can then commence. During such time, the CPU 50 monitors the various detectors and sensors of the trunk interface circuits 40a–40n to detect disconnect conditions. The CPU 50 monitors disconnect conditions of either the calling party or the called party, as noted in program flow block 106. In the event the called party associated with key telephone system 10 goes on-hook, and thus effects a disconnect, and if the key telephone system trunks 34 are of the ground-start type, the CPU 50 can detect such conditions by circuits within the respective trunk interface 40. On detecting a disconnect by the called party, the CPU 50 branches back to program flow block 82, thereby permitting the calling party to initiate another telephone call without also going on-hook. On the other hand, if the calling party effects a disconnect on the incoming trunk 33, or if the key telephone trunk 34 is of the loop-start type, the CPU 50 proceeds to idle respective incoming trunk 33, as noted by program flow block 108. Other registers and equipment utilized in establishing the telephone call may also be idled or reinitialized. From block 108, the CPU 50 returns to a program start point, such as the scanning of the incoming trunks 33 to detect request for service, as noted by block 80.

From the foregoing, disclosed is a call processor for facilitating the completions of telephone calls to a key telephone system. A technical advantage presented by the invention is that little or no modification need be made to the key telephone system to integrate the call processor therewith. In addition, another technical advantage of the invention is that the call processor can be easily added to existing key telephone systems and operate transparent thereto for effecting the completions of calls. In the alternative, the call processor of the invention can be integrated within key telephone system designs to provide the noted advantages and functions. An important technical advantage of the invention is that calling parties directing telephone calls to key telephone systems employing the invention can complete calls directly to the called parties, without the intervention of intermediate parties. To that end, the call processor is program controlled and includes a number of voice messages directed to the calling party, as well as to the called party to achieve such a direct connection.

Therefore, while the preferred embodiment of the invention has been disclosed with reference a specific call processor, it is to be understood that many changes in detail may be made as a matter of engineering choices without departing from the spirit and scope of the invention, as defined by the appended claims.

What is claimed is:

1. A call processor adapted for use with a multiline key telephone system, comprising:
   a detector for detecting requests for service directed to the key telephone system;
   a message storage unit for generating and transmitting a message to a calling party initiating the request for service, said message including a content for associating called parties with respective digits;
   a transmitter for transmitting a request for service to the key telephone system;

said message storage unit providing a message for transmission to the key telephone system for announcing to whom the call is directed and which line to utilize for communications; and said call processor causing the calling party to be connected to the called party.

2. The call processor of claim 1, further including an intercom line interconnecting said call processor to the key telephone system for carrying said message.

3. The call processor of claim 2, further including means for selectively switching said intercom line to a desired message for said announcing.

4. The call processor of claim 1, further including switch means for interconnecting a plurality of incoming trunks to a corresponding plurality of other trunks connected to the key telephone system.

5. The call processor of claim 1, further including a single message storage unit for storing a first message for transmission to a calling party and for storing a second message for announcement by the key telephone system.

6. The call processor of claim 5, wherein said message storage unit further includes a memory for storing a plurality of messages uniquely associated with a plurality of user of the key telephone system.

7. The call processor of claim 5, further including a switch circuit for switching said first message to the calling party, and for switching said announcement message to the key telephone system.

8. The call processor of claim 1, further including a look-up table for storing data for associating called parties with said digits.

9. The call processor of claim 8, further including a receiver for receiving telephone digits input by the calling party, and CPU means for utilizing such digits in referencing other information in said look-up table.

10. The call processor of claim 9, further including means for selecting a message for said announcement based upon referencing of said look-up table.

11. The call processor of claim 1, further including means in said call processor for intercepting ringing signals on an input thereof, and for generating and transmitting other ringing signals on an output thereof to the key telephone system.

12. A call processor adapted for use with a multiline key telephone system, comprising:
   an interface for interconnecting incoming call processor trunks to trunks connected to the key telephone system;
   a ring detect circuit for detecting ringing signals on the incoming trunks;
   a ring generator for transmitting ringing signals on the key telephone system trunks;
   a DTMF receiver for receiving DTMF signals carried on the incoming trunks and for decoding the DTMF signals into digits;
   an intercom line connected between said call processor and the key telephone system;
   a message announcement unit for storing messages for transmission to calling parties on the incoming trunks, and for storing other messages for transmission to the key telephone system on the intercom line; and
   a programmed CPU for controlling the call processor to complete telephone calls to the key telephone system.

13. The call processor of claim 12, further including means for selectively transmitting messages from said message storage unit on said intercom line.

14. The call processor of claim 12, wherein said call processor includes means for associating pseudo-extension numbers with users of the key telephone system.

15. The call processor of claim 14, further including means for transmitting said pseudo-extension numbers to the calling party for enabling the calling party to input information indicating the selection of one said key telephone system user.

16. The call processor of claim 12, further including a translator for receiving from the calling parties information which is unique with respect to desired called parties of the key telephone system, and for translating the unique information into said other messages indicating to whom the incoming call is directed and which line to utilize for communications.

17. A key telephone system, comprising:
   a plurality of key telephone sets, each having a capability of communications over multiple lines;
   a central control unit for establishing communications between calling parties initiating calls to called parties using said key telephone sets;
   an intercom system controlled by said central control for announcing audio messages in the vicinity of said key telephone sets;
   said central control being responsive to incoming calls for transmitting a message to the calling parties, said message reciting a pseudo-extension number associated with each said called party, said message instructing the calling party to input one said pseudo-extension number associated with a desired said called party;
   a receiver for receiving a pseudo-extension number from the calling party; and
   said central control transmitting a message over said intercom system instructing the called party associated with the pseudo-extension number to respond to one said key telephone set.

18. The key telephone system of claim 17, further including a memory for storing a plurality of messages, each associated with and uniquely identifying each said called party.

19. The key telephone system of claim 18, wherein each said message includes an instruction to respond to a particular said line, and an instruction identifying by name a respective said called party.

20. The key telephone system of claim 19, further including means for coupling together each said instruction with one said name in response to a pseudo-extension number input by a calling party.

21. A call processor adapted for use with a key telephone type system, comprising:
   an interface for receiving incoming calls directed to the key telephone system and for directing corresponding processed calls to the key telephone system;
   a message storage unit for storing messages adapted for transmission to calling parties making incoming calls to called parties using the key telephone system;
   a memory storing called party identification information which is referenced to messages stored in said message storage unit;
   a processor responsive to incoming calls for selecting a message from said storage unit and transmitting a message relating to called parties and associated digit information and soliciting the input from the calling party of digit information corresponding to a called party with whom communications are desired;

said call processor responding to digit information input by the calling party for accessing said memory using said input digit information to select a message in said storage unit for transmission to the key telephone system; and a transmitter responsive to said processor for transmitting to said key telephone system a message which is associated with digit information input by the calling party.

22. The call processor of claim 21, wherein said transmitter transmits said message to said key telephone system via an intercom line.

23. The call processor of claim 21, wherein said memory comprises storage areas referencing digit information with names of called parties.

24. The call processor of claim 21, wherein said message stored in said message storage unit comprises identities of called parties and a key telephone system line receiving an incoming call.

25. The call processor of claim 21, wherein said processor waits a predetermined period of time for input of digit information by said calling party, and if no digit information is input, said processor defaults to a predetermined message for transmission to the key telephone system.

26. The call processor of claim 25, wherein said processor automatically selects default digit information in said memory for accessing a message in said storage unit for transmission to the key telephone system, said default message defining a general message transmitted to the key telephone system.

27. The call processor of claim 21, wherein said processor monitors indications of on-hook conditions of a telephone connected to the key telephone system.

28. The call processor of claim 27, wherein said processor is responsive to an on-hook disconnect of a key telephone system telephone set for generating a message for transmission thereof to the calling party so that the calling party does not need to go on hook before initiating a second telephone call to the key telephone system.

29. The call processor of claim 21, wherein said call processor is responsive to day and night conditions for accessing different messages in said storage unit which are related to day and night operation of said key telephone system.

30. The call processor of claim 21, wherein said memory comprises storage locations indexed by digital signals corresponding to digital information input by the calling party, and said indexed locations have stored therein addresses of said message storage unit for accessing by said processor for selecting a message corresponding to the input digit information.

31. The call processor of claim 30, wherein said message storage unit stores information corresponding to verbal prompts associated with a key telephone system telephone line receiving an incoming call.

32. The call processor of claim 31, wherein said processor selects an idle outgoing line to said key telephone system in response to an incoming call, and based upon said selected line, said processor accesses said message storage unit to select an associated verbal prompt which is appended to the identity of the called party, and said processor transmits a message to the key telephone system instructing a particular called party to answer a particular line.

33. A method for processing telephone calls incoming to a key telephone system to facilitate communications therewith, comprising the steps of:

receiving incoming calls directed to the key telephone system and processing said calls;

storing messages in a message storage unit for transmission to calling parties making incoming calls to called parties using the key telephone system;

storing called party identification information messages in a memory;

transmitting to calling parties a message retrieved from said message storage unit, said transmitted message relating to a called party and associated digit information, and soliciting from the calling party an input of digit information corresponding to the called party with whom communications are desired;

responding to digit information input by the calling party for accessing said memory, and using said input digit information for defining a message for transmission to the key telephone system; and transmitting to the key telephone system a message which is associated with digit information input by the calling party.

34. The method of claim 33, further including transmitting the message to the key telephone system via an intercom line.

35. The method of claim 33, further including storing in said memory digit information which is referenced with respect to names of called parties.

36. The method of claim 33, further including storing in said message storage unit identities of the called parties and a key telephone system line receiving an incoming call.

37. The method of claim 33, further including waiting a predetermined period of time for input of digit information by the calling party, and if no digit information is input, defaulting to a predetermined message for transmission to the key telephone system.

38. The method of claim 37, further including automatically selecting default digit information in said memory for accessing a message in said storage unit for transmission to the key telephone system.

39. The method of claim 33, further including monitoring on-hook conditions of a telephone connected to the key telephone system.

40. The method of claim 39, further including responding to an on-hook disconnect of a key telephone system telephone set and generating a message and causing transmission thereof to the calling party so that the calling party does not need to go on-hook before initiating a second telephone call to the key telephone system.

41. The method of claim 33, further including transmitting messages to the calling parties, said messages being related to day and night operations of the key telephone system.

42. The method of claim 33, further including indexing storage locations of said memory with digital signals corresponding to digital information input by the calling party, and storing in said indexed locations addresses of said message storage unit for accessing by said processor for selecting a message corresponding to the input of digit information 43. The method of claim 42, further including storing in said message storage unit data corresponding to verbal prompts associated with a key telephone system telephone line receiving an incoming call.

44. The method of claim 33, further including selecting an idle outgoing line to the key telephone system in response to an incoming call, and based upon said selected line, accessing said memory storage unit to select an associated verbal prompt which is then appended to the identity of the called party, and transmitting a message to the key telephone system instructing a particular called party to answer a particular line.

45. A call processor adapted for use with a telephone switching system for facilitating the completion of telephone calls, comprising:
   a detector for detecting a request for service directed to the switching system by a calling party;
   a message storage unit for generating and transmitting a first type message to the calling party, said message including a message content identifying a called party and digit information to input for accessing the called party;
   a receiver for receiving digit information input by the calling party;
   a process responsive to digit information input by the calling party for accessing said message storage unit for retrieving a second type message identifying a person associated with said digit information; and
   a transmitter for transmitting to the switching system said second type message to facilitate the completion of a call by the calling party.

46. The call processor of claim 45, wherein said transmitter transmits said second type message to the telephone switching system on an intercom line.

47. The call processor of claim 45, further including in combination a key telephone system defined as said telephone switching system.

48. The call processor of claim 45, wherein said called party is associated with a telephone set having associated extension number, and said digit information comprises a pseudo-extension number associated with the called party.

49. A method for accessing a telephone switching system for facilitating the completion of telephone calls, comprising the steps of:
   detecting a request for service directed to the switching system by a calling party;
   accessing a first type message from a message storage unit and transmitting said message to the calling party, said message including a message content identifying a called party and digit information to input for accessing the called party;
   receiving digit information input by the calling party;
   responding to input digit information by a processor by accessing said message storage unit for retrieving a second type message identifying a person associated with said digit information; and
   transmitting to the switching system said second type message to facilitate the completion of a call by the calling party.

50. The method of claim 49, further including transmitting said second type message to the telephone switching system on an intercom line.

51. The method of claim 49, further including transmitting said second type message to a key telephone system defined as said telephone switching system.

52. The method of claim 49, wherein said called party is associated with a telephone set having an associated extension number, and said digit information comprises a pseudo-extension number associated with the called party.

* * * * *

UNITED STATES PATENT AND TRADEMARK OFFICE
CERTIFICATE OF CORRECTION

PATENT NO. : 4,922,526

DATED : May 1, 1990

INVENTOR(S) : Sanford J. Morganstein, et al.

It is certified that error appears in the above-identified patent and that said Letters Patent is hereby corrected as shown below:

Column 1, line 8, after "Dec. 16, 1987," insert --now--.

Column 6, line 66, after "for" insert --,--.

Column 8, line 12, after "trunk" insert --33--.

Signed and Sealed this

Eleventh Day of June, 1991

Attest:

HARRY F. MANBECK, JR.

*Attesting Officer*  *Commissioner of Patents and Trademarks*